United States Patent
Na et al.

(10) Patent No.: US 7,349,037 B2
(45) Date of Patent: Mar. 25, 2008

(54) LIQUID CRYSTAL DISPLAY DEVICE

(75) Inventors: Du-Hyun Na, Incheon (KR);
Choel-Min Woo, Gyeongsangbuk-Do (KR)

(73) Assignee: LG. Philips LCD. Co., Ltd, Seoul (KR)

( * ) Notice: Subject to any disclaimer, the term of this patent is extended or adjusted under 35 U.S.C. 154(b) by 226 days.

(21) Appl. No.: 11/027,428

(22) Filed: Dec. 30, 2004

(65) Prior Publication Data

US 2005/0219432 A1    Oct. 6, 2005

(30) Foreign Application Priority Data

Apr. 6, 2004   (KR) .................... 10-2004-0023529

(51) Int. Cl.
*G02F 1/1333*    (2006.01)
*G02F 1/1343*    (2006.01)

(52) U.S. Cl. ..................... 349/40; 349/139
(58) Field of Classification Search ............. 349/40, 349/38, 39, 43, 139, 192
See application file for complete search history.

(56) References Cited

U.S. PATENT DOCUMENTS

| 5,909,035 A | * | 6/1999 | Kim ........................ 257/59 |
| 6,388,719 B1 | * | 5/2002 | Matsunaga et al. ........ 349/40 |
| 2002/0018154 A1 | * | 2/2002 | Yoo et al. .................. 349/40 |

* cited by examiner

*Primary Examiner*—David Nelms
*Assistant Examiner*—David Chung
(74) *Attorney, Agent, or Firm*—Brinks Hofer Gilson & Lione

(57) ABSTRACT

A LCD device includes substrates attached to each other with a cell gap therebetween. An image display unit is composed of pixels arranged on the first substrate, for substantially displaying an image. Gate lines are arranged in a horizontal direction, for applying a gate low voltage and a gate high voltage to the image display unit. Data lines are arranged in a vertical direction, for applying image information to the image display unit. A common voltage line applies a common voltage. First electrostatic preventing units are respectively connected to one side of the data lines and commonly connected to a first gate line. Second electrostatic preventing units are respectively connected to one side of the gate lines and commonly connected to the common voltage line. Third electrostatic preventing units connect the first gate line and the common voltage line.

23 Claims, 2 Drawing Sheets

LIQUID CRYSTAL DISPLAY DEVICE

This application claims the benefit of Korean Patent Application No. 2004-23529, filed in Korea on Apr. 6, 2004, which is hereby incorporated by reference for all purposes as if fully set forth herein.

TECHNICAL FIELD

The present invention relates to a LCD device, and more particularly, to a LCD device capable of preventing degradation of image quality due to a leakage current by removing a difference of voltages applied to both sides of an electrostatic preventing unit.

BACKGROUND

1. Description of the Conventional Art

In the recent information age, a display device is becoming more and more important as a visual information transmission media. The display device has to satisfy low power consumption requirements, be thin and light, produce high image quality, etc.

A liquid crystal display (LCD) device displays an image by using optical anisotropy of a liquid crystal material. The LCD has better viewing characteristics and less power consumption and heating than the conventional cathode-ray tube (CRT). These characteristics promote the LCD device as the next generation display device.

A liquid crystal material used in the LCD device is not a spontaneous light emitting material, but material receptive of light for displaying an image by modulating an amount of external light. Thus, in the conventional LCD device, an additional light source for irradiating light to a LCD panel, that is, a backlight unit is required.

Generally, an LCD device contains a LCD panel with a thin film transistor array (TFT) substrate and a color filter (CF) substrate that face each other are attached to each other to have a certain cell gap. A driving unit is provided for driving the LCD panel. A back-light unit is provided at a rear surface of the LCD panel for supplying light to a liquid crystal layer of the LCD panel.

On the TFT substrate of the LCD panel, a plurality of gate lines arranged in a horizontal direction at a regular interval are perpendicular to a plurality of data lines arranged in a vertical direction at a regular interval. The intersection region formed by the crossing gate lines and the data lines is defined as a pixel.

The pixel is provided with a switching device, such as a thin film transistor, and a pixel electrode. The switching device is electrically connected to the data line and the gate line to receive image information through the data line and to apply the image information to a pixel electrode while maintaining a turn-on state by a gate voltage applied through the gate line. The pixel electrode forms an electric field with a common electrode provided at the CF substrate thereby changing the orientation of the liquid crystal molecules.

The CF substrate is provided with red (R), green (G), and blue (B) color filters for separating light supplied from the back-light unit into R, G, and B light and for displaying various color images by mixing the R, G, and B light. A black matrix for preventing light leakage is formed at outer peripheries of the R, G, and B color filters. A common electrode is formed at whole surface of the CF substrate, and applies an electric field to the liquid crystal layer with the pixel electrode thereby to change an arrangement form of the liquid crystal molecules. This permits the common electrode to control the transmittance of light supplied from the back-light unit and display an image of the LCD panel.

The driving unit consists of a data driving unit and a gate driving unit. When the gate driving unit sequentially applies a gate voltage to each gate line, the switching devices electrically connected to the gate line to which the gate voltage is applied are turned on and the turned on switching devices receive image information from the data lines. At this time, the image information is applied to the pixel through the switching device, and is applied to the pixel electrode provided in the pixel.

The LCD device uses a holding method. When the gate driving unit sequentially applies a gate high voltage to each gate line, image information applied to the pixel through the data line is applied to the pixel electrode thereby to be charged at a storage capacitor. The storage capacitor maintains the state of the liquid crystal molecules for one frame even when a gate high voltage is transferred into a gate low voltage thereby to maintain a brightness of the pixels.

The LCD device can be driven by an external or internal voltage change. When devices inside the LCD device are destroyed by an electrostatic discharge or an over-voltage, the image quality is degraded. In order to reduce the damage due to a sudden high voltage, an electrostatic preventing unit is provided in the LCD device.

FIG. 1 is a drawing schematically showing a general LCD device.

As shown in FIG. 1 the LCD device consists of a LCD panel 1 with a TFT substrate (not shown) and a CF substrate (not shown) facing each other and attached to each other to have a certain cell gap. A plurality of data lines 15 are arranged on the LCD panel 1 in a vertical direction and a plurality of gate lines 16 are arranged on the LCD panel 1 in a horizontal direction. A data driving unit 5 supplies image information to the data lines 15 and a gate driving unit 6 supplies control signals and driving voltages to the gate lines 16. A common voltage line 32 formed on the thin film transistor array substrate applies a common voltage (VCOM) to a common electrode of the color filter substrate. An electrostatic preventing unit 10 is connected to the gate lines 16 and the data lines 15. The electrostatic preventing unit 10 disperses the current.

The intersection regions of the data lines 15 and the gate lines 16 are defined as pixels P1. The pixels P1 are arranged on the TFT substrate in a matrix thereby to constitute an image display unit 20 for substantially displaying an image.

The LCD device is provided with a timing control unit and a power supplying unit. Image information and the control signals outputted from the timing control unit, and the driving voltages outputted from the power supplying unit are supplied to the gate driving unit 6 through the data driving unit 5.

As shown, the data driving unit 5 and the gate driving unit 6 are electrically connected to each other through a connecting line 34. The data driving unit 5 applies a gate low voltage VGL to the gate driving unit 6 through the connecting line 34. Although not shown, a plurality of lines are formed in order to connect the data driving unit 5 and the gate driving unit 6. Through the plurality of lines, the gate driving unit 6 receives a gate high voltage VGH and a common voltage VCOM. The common voltage VCOM is formed along an outer periphery of the thin film transistor array substrate, and is applied to the gate driving unit 6 through the common voltage line 32 connected to the data driving unit 5 and the gate driving unit 6.

The common voltage VCOM supplied to the gate driving unit 6 through the common voltage line 32 is applied to Ag dots (not shown) formed at edges of the thin film transistor array substrate. Since the Ag dot electrically connects the thin film transistor array substrate and the color filter substrate, the common voltage VCOM applied to the Ag dot is applied to the color filter substrate.

The control signals and driving voltages for driving the LCD device are supplied to the gate driving unit 6 from the timing control unit. Especially, a gate low voltage VGL and a gate high voltage VGH are applied to the gate driving unit 6. The gate low voltage VGL is applied to all the gate lines 16, and the gate high voltage VGH is sequentially applied to the gate lines 16 one by one, thereby turning-on the thin film transistor, the switching device provided at the pixels P1. At this time, image information is supplied to the pixels P1 through the data lines 15.

An electrostatic preventing unit 10 is respectively provided at one side of the data lines 15 and the gate lines 16. One side of the electrostatic preventing unit 10 is electrically connected to the data lines 15 or the gate lines 16, and another side of the electrostatic preventing unit 10 is connected to the common voltage line 32. The common voltage line 32 is electrically connected to the electrostatic preventing units 10 connected to the gate lines 16 and the electrostatic preventing units 10 connected to the data lines 15.

The electrostatic preventing units 10 are not operated at ordinary times. However, when an over-current is suddenly applied to the data lines 15 and the gate lines 16 due to an electrostatic inflow, the electrostatic preventing units 10 are conductive and thereby the gate lines 16 and the data lines 15 are connected through the common voltage line 32. This permits the current to be dispersed amongst the gate lines 16 and the data lines 15, thereby minimizing damage of the LCD device due to an electrostatic discharge.

The electrostatic preventing unit 10 protects each kind of device at the time of an instantaneous high voltage occurrence. The electrostatic preventing unit 10 has to be formed so that a current can not flow thereto at ordinary times. The gate low voltage VGL or the gate high voltage VGH outputted from the gate driving unit 6 is applied to one side of the electrostatic preventing unit 10, and the common voltage VCOM outputted from the common voltage line 32 is applied to another side of the electrostatic preventing unit 10. A voltage difference is thus generated between both sides of the electrostatic preventing unit 10. Therefore, a leakage current flows through the electrostatic preventing unit 10 due to the voltage difference even when the electrostatic preventing unit 10 is cut-off, and thereby a voltage level of the gate low voltage VGL or the gate high voltage VGH applied to each gate line 16 may be changed. When the voltage level of the gate low voltage VGL becomes unstable due to the leakage current, the pixels of the image display unit 20 cause a voltage change and thereby degrade the picture quality.

SUMMARY

The LCD device prevents the picture quality from being degraded by minimizing distortion of a gate low voltage or a gate high voltage applied to gate lines. The leakage current is minimized by removing a voltage difference between both sides of an electrostatic preventing unit.

By way of introduction only, in one embodiment, a display device contains first and second substrates attached to each other with a cell gap therebetween. An image display unit is provided that contains a plurality of pixels arranged on the first substrate. A plurality of gate lines is arranged on the first substrate in a horizontal direction. The gate lines apply a gate low voltage and a gate high voltage to the image display unit. A plurality of data lines are arranged on the first substrate in a vertical direction. The data lines apply image information to the image display unit. A common voltage line is formed on the first substrate. The common voltage line applies a common voltage to the second. substrate. First electrostatic preventing units are respectively connected to one side of the gate lines and are commonly connected to a first gate line. Second electrostatic preventing units are respectively connected to one side of the data lines and are commonly connected to the common voltage line. Third electrostatic preventing units connect the first gate line and the common voltage line.

In another embodiment, the display device contains gate lines and data lines arranged on the first substrate in horizontal and vertical directions to define pixels. A gate driving unit applies a gate low voltage and a gate high voltage to the pixels through the gate lines while a data driving unit applies image information to the pixels through the data lines. A first line is connected to the gate lines through first electrostatic preventing units. The first line is also connected to the data driving unit and receives the gate low voltage from the data driving unit. A common voltage line is connected to the data lines through second electrostatic preventing units and is connected to the first lines through a third electrostatic preventing unit.

In another embodiment, the display device contains means for simultaneously supplying all of the gate lines with the gate low voltage, simultaneously supplying all of the data lines with the common voltage, and linking the gate low voltage and common voltage, when undesired electrostatic charge is present in the gate or data lines to dissipate the electrostatic charge throughout all of the gate and data lines while minimizing leakage current when the display device is operating normally.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

A LCD device includes first and second substrates attached to each other with a cell gap therebetween. An image display unit contains a plurality of pixels arranged on the first substrate, for substantially displaying an image. A plurality of gate lines are arranged on the first substrate in a horizontal direction for applying a gate low voltage and a gate high voltage to the image display unit and a plurality of data lines are arranged on the first substrate in a vertical direction for applying image information to the image display unit. A common voltage line is formed on the first substrate for applying a common voltage to the second substrate. First electrostatic preventing units are connected at one side of the gate lines and commonly connected to a first gate line, second electrostatic preventing units are connected at one side of the data lines and commonly connected to the common voltage line, and third electrostatic preventing units connect the first gate line and the common voltage line.

A voltage difference between both sides of the electrostatic preventing units respectively connected at one side of the gate lines is not generated by equally setting the voltages applied to both sides of the electrostatic preventing units. A leakage current is not generated, which prevents the gate voltage from being distorted and accordingly degradation of the picture quality.

Figure 1:
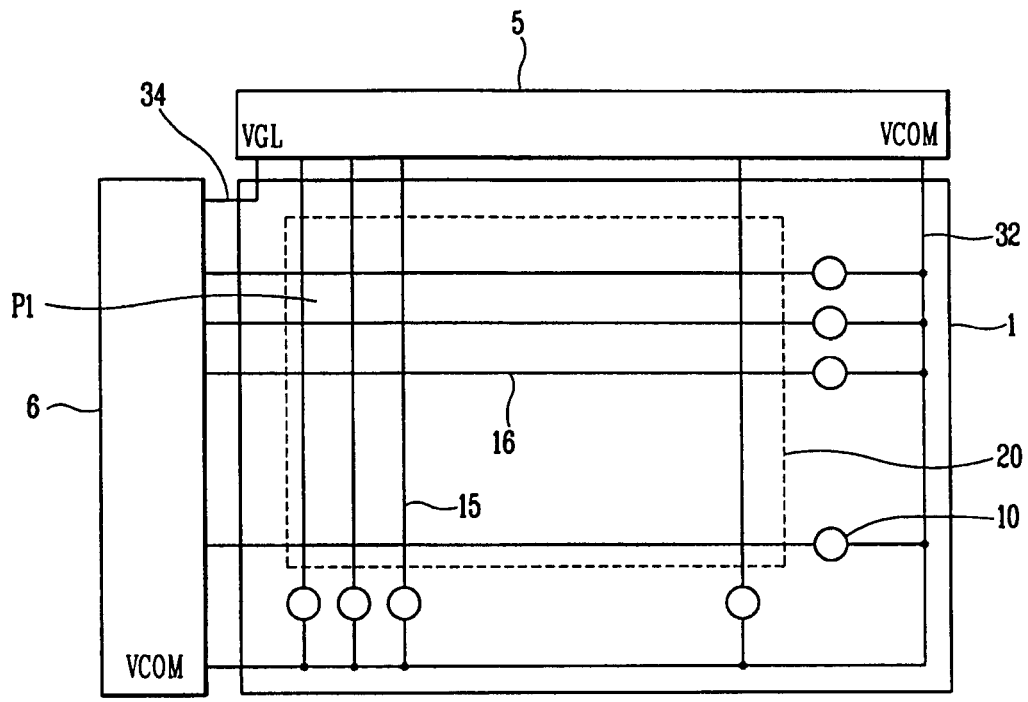
FIG. 1 is a view schematically showing a LCD device in accordance with the conventional art.
Figure 2:
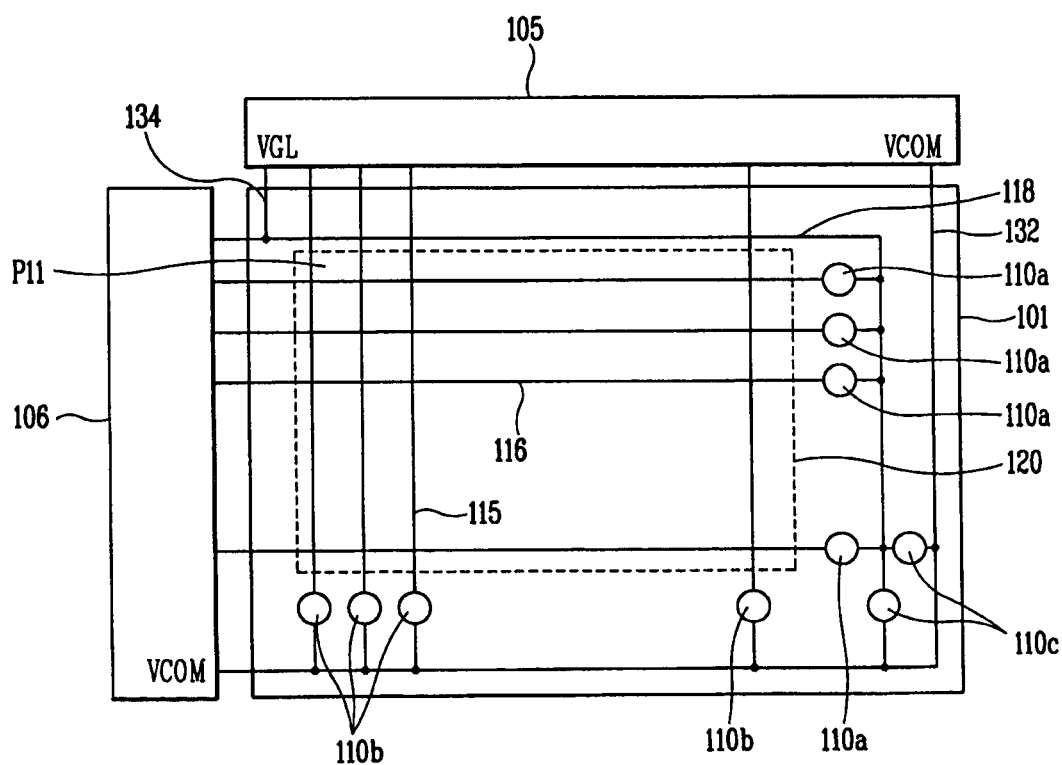
FIG. 2 is a view showing an LCD device according to one embodiment of the present invention.

FIG. 2 is a view showing an LCD device according to one embodiment of the present invention.

Referring to FIG. 2, the LCD device contains a LCD panel 101 having first and second substrates facing and attached to each other with a cell gap therebetween. An image display unit 120 contains a plurality of pixels P11 arranged on the first substrate for substantially displaying an image. A plurality of gate lines 116 are arranged on the first substrate in a horizontal direction for applying a gate low voltage and a gate high voltage to the image display unit 120 and a plurality of data lines 115 are arranged on the first substrate in a vertical direction for applying image information to the image display unit 120. A common voltage line 132 is formed on the first substrate for applying a common voltage to the second substrate. First electrostatic preventing units 110a are connected at one side of the gate lines 116 and are commonly connected to a first gate line 118. Second electrostatic preventing units 110b are connected at one side of the data lines 115 and are commonly connected to the common voltage line 132. Third electrostatic preventing units 110c connect the first gate line 118 and the common voltage line 132.

On the LCD panel 101, the gate lines 116 and the data lines 115 cross each other thereby to define a plurality of pixels P11. The pixels P11 are arranged on the LCD panel 101 in a matrix. On the LCD panel 101, the image display unit 120 is provided that contains the plurality of pixels P11 and displays an image.

The data lines 115 are formed up to the edge of the LCD panel 101 thereby to be electrically connected to a data driving unit 105, and the gate lines 116 are formed up to the edge of the LCD panel 101 thereby to be electrically connected to a gate driving unit 106. This allows image information outputted from the data driving unit 105 to be applied to the pixels of the image display unit 120 through the data lines 115. Also, a gate high voltage VGH or a gate low voltage VGL outputted from the gate driving unit 106 is applied to the pixels of the image display unit 120 through the gate lines 116.

The data driving unit 105 receives control signals and image information from a timing control unit for generating control signals and image information and outputting according to data supplied from outside, and receives driving voltages from a power supplying unit for generating driving voltages necessary to drive the LCD device. The driving voltages generated from the power supplying unit include a gate low voltage VGL, a gate high voltage VGH, and a common voltage VCOM.

The gate low voltage VGL is supplied to the gate driving unit 106 through a gate low voltage line 134 for connecting the data driving unit 105 and the gate driving unit 106. As shown, the gate low voltage line 134 is connected to the gate driving unit 106, and is connected to a first gate line 118 thereby to apply the gate low voltage VGL to the first gate line 118.

The first gate line 118 is a dummy line to which a gate low voltage or a gate high voltage is not applied from the gate driving unit 106, and maintains a low potential state by the gate low voltage VGL applied from the data driving unit 105. The gate low voltage VGL or the gate high voltage VGH is sequentially applied from the second gate line to the final gate line. Since the first gate line 118 does not substantially apply a gate voltage to the pixels, the first gate line 118 is preferably formed at an outer periphery of the image display unit 120 in order to prevent an aperture ratio of the pixels from being decreased.

Although not shown, the common voltage VCOM and the gate high voltage VGH are applied to the gate driving unit 106 through lines for electrically connecting the data driving unit 105 and the gate driving unit 106.

A common voltage line 132 is formed along an outer periphery of the image display unit 120. One end of the common voltage line 132 is connected to the data driving unit 105 and another end of the common voltage line 132 is connected to the gate driving unit 106, so that the common voltage VCOM is applied to both the data driving unit 105 and the gate driving unit 106. Also, the common voltage line 132 is formed at the edges of the first substrate and is connected to an Ag dot (not shown) electrically connected to the second substrate. Thus, the common voltage VCOM is applied to a common electrode of the second substrate through the Ag dot.

A first electrostatic preventing unit 110a is respectively provided at one side of each of the gate lines 116 arranged on the first substrate in a horizontal direction. One side of each of the first electrostatic preventing units 110a is connected to the respective gate line 116, and the other side thereof is commonly connected to the first gate line 118 formed along the outer periphery of the LCD panel 101.

The gate low voltage VGL or the gate high voltage VGH from the gate driving unit 106 is thus applied to one side of the first electrostatic preventing units 110a, and the gate low voltage VGL is applied to another side of the first electrostatic preventing units 110a through the first gate line 118. This permits a gate voltage of the same potential to be applied to both sides of the first electrostatic preventing units 110a thereby preventing a leakage current due to a voltage difference.

The first gate line 118 to which the first electrostatic preventing units 110a are commonly connected is connected to the common voltage line 132 through the third electrostatic preventing unit 110c.

The second electrostatic preventing units 110b are respectively provided at one side of the data lines 115 arranged on the first substrate in a vertical direction. The data lines 115 are commonly connected to the common voltage line 132 through the second electrostatic preventing units 110b.

As mentioned, the gate lines 116 and the data lines 115 are electrically connected to each other through the first, second, and third electrostatic preventing units 110a, 110b, and 110c. Thus, even when an electrostatic discharge is introduced to one of the gate lines 116 and the data lines 115, an overcurrent due to the electrostatic discharge can be dispersed to the entire lines through the first, second, and third electrostatic preventing units 110a, 110b, and 110c. The same potential is applied to both sides of the first electrostatic preventing units 110a for preventing an electrostatic discharge, so that the gate low voltage VGL applied to the gate lines 116 is prevented from being distorted.

However, a voltage difference between both sides of the first electrostatic preventing units 110a is actually generated. The reason is because the first gate line 118 for receiving the gate low voltage VGL from the data driving unit 105 and applying it to each electrostatic preventing unit 110a is formed along the outer periphery of the first substrate. This causes a large line resistance to be generated at the first gate line 118, and thereby a voltage of the gate low voltage VGL applied to the first gate line 118 is lowered. The lowered voltage of the gate low voltage VGL is applied to each first electrostatic preventing unit 110a, so that potentials applied to both sides of the first electrostatic preventing units 110a are substantially different. A leakage current is generated by the voltage difference between both sides of the first electrostatic preventing units 110a.

When a leakage current flows through the first electrostatic preventing units 110a, the gate low voltage VGL applied to the gate lines 116 is distorted when the pixels P11 is driven. Thus, desired image information is not inputted to the pixels P11 and the desired image is not displayed.

Figure 3:
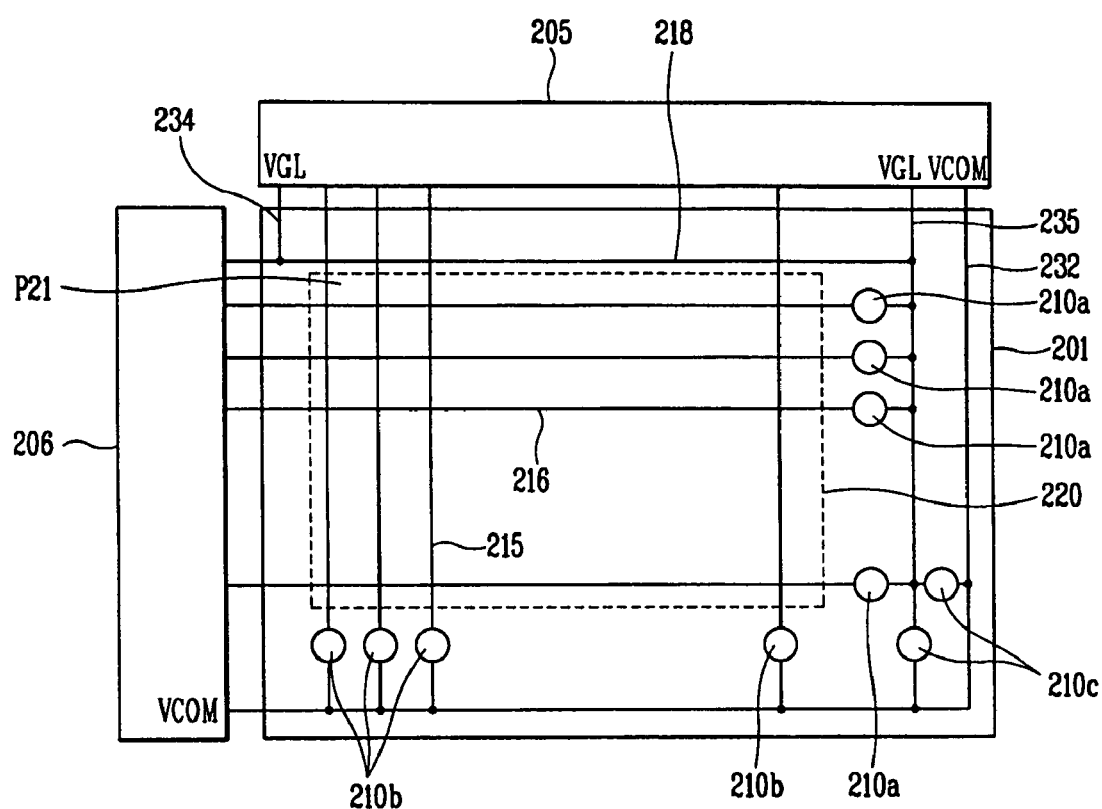
FIG. 3 is a view showing an LCD device according to a second embodiment of the present invention.

FIG. 3 is a view showing an LCD device according to a second embodiment of the present invention.

As shown in FIG. 3, the LCD device includes a LCD panel 201 having first and second substrates facing each other and attached with a cell gap therebetween. An image display unit 220 containing a plurality of pixels P21 is arranged on the LCD panel 201 in a matrix for substantially displaying an image. A plurality of gate lines 216 is arranged on the first substrate in a horizontal direction for applying a gate low voltage and a gate high voltage to the image display unit 220 and a plurality of data lines 215 is arranged on the first substrate in a vertical direction for applying image information supplied from a data driving unit 205 to the image display unit 220. A common voltage line 232 formed on the first substrate applies a common voltage VCOM to the second substrate. A low voltage line 235 is formed along an outer periphery of the first substrate and receives a gate low voltage VGL through at least two paths from the data driving unit 205. First electrostatic preventing units 210a are respectively connected to one side of the gate lines 216 and commonly connected to the gate low voltage line 235, second electrostatic preventing units 210b are respectively connected to one side of the data lines 215 and commonly connected to the common voltage line 232, and third electrostatic preventing units 210c connect the low voltage line 235 and the common voltage line 232.

A driving unit of the LCD device includes a timing control unit for receiving external data and generating control signals and image information using the data. A power supplying unit generates various driving voltages to be used to drive the LCD device by a power supplied from the outside. A data driving unit 205 receives image information and the control signal outputted from the timing control unit, and outputs the image information to the image display unit 220. A gate driving unit 206 receives driving voltages and control signals from the timing control unit and the power supplying unit, and applies a gate low voltage VGL or a gate high voltage VGH to the image display unit 220.

The gate driving unit 206 is connected to the data driving unit 205 by a plurality of lines, and receives control signals and driving voltages from the data driving unit 205 through the lines. A gate low voltage VGL, a gate high voltage VGH, and a common voltage VCOM are applied to the gate driving unit 206. The gate low voltage VGL is supplied to the gate driving unit 206 from the data driving unit 205 through a connecting line 234. The gate low voltage VGL is applied to all the gate lines 216 through the gate driving unit 206, and the gate high voltage is sequentially applied to each gate line 216 as a frame unit.

Image information converted into an analog form in the data driving unit 205 is applied to pixels P21 through the data lines 215 synchronized with the gate high voltage of the gate driving unit 206 thus to be applied to pixels P21 through the data lines 215.

The first electrostatic preventing units 210a are respectively connected to one side of the gate lines 216, and are commonly connected to the low voltage line 235 formed at the outer periphery of the first substrate.

In the second embodiment of the present invention, the gate low voltage VGL is applied to the first electrostatic preventing units 210a through the first gate line 218 formed along the outer periphery of the first substrate not through the low voltage line 235. Because of this, a lowered voltage is generated due to the line resistance of the first gate line 218. To decrease the line resistance, a line for applying the gate low voltage VGL to the first electrostatic preventing units 210a is short. Also, in order to compensate the voltage lowering due to the line resistance, the gate low voltage VGL can be applied to the first gate line 218 through many paths of the data driving unit 205.

In the second embodiment of the present invention, the gate low voltage VGL is applied to the first gate line 218 by connecting the data driving unit 205 and the first gate line 218 through many paths. That is, like in the first embodiment, the data driving unit 205 and the first gate line 218 are electrically connected at an edge of the LCD panel 201 where the first gate line 218 is formed thereby to apply the gate low voltage VGL to the first gate line 218. Also, the data driving unit 205 and the first electrostatic preventing units 210a are connected to each other with the shortest distance at another edge of the LCD panel 201 thereby to form another path for applying the gate low voltage VGL. According to this, the gate low voltage VGL that has not been voltage-lowered can be applied to the first electrostatic preventing units 210a, so that a voltage difference between both sides of the first electrostatic preventing units 210a is removed thus to prevent a leakage current. The shortest distance can be formed as a straight line or a non-straight line according to the kind of device and lines on the first substrate.

The second electrostatic preventing units 210b are respectively connected to one side of the data lines 215. The second electrostatic preventing units 210b are commonly connected to the common voltage line 232, and are electrically connected to the gate lines 216 through the common voltage line 232 and the third electrostatic preventing units 210c.

As mentioned, the gate lines 216 and the data lines 215 are electrically connected to each other through the first, second, and third electrostatic preventing units 210a, 210b, and 210c. Thus, even when an electrostatic discharge is introduced to one of the gate lines 216 and the data lines 215, an over-current due to the electrostatic discharge can be dispersed to the entire lines through the first, second, and third electrostatic preventing units 210a, 210b, and 210c and thereby minimize damage to the LCD device.

The first, second, and the third electrostatic preventing units 210a, 210b, and 210c are provided at the outer periphery of the image display unit 220. The gate low voltage line 235 is also formed at the outer periphery of the image display unit 220 in order to enhance an aperture ratio of the image display unit 220 and in order to utilize the outer periphery region of the image display unit 220 where a space is comparatively obtained.

As mentioned, the same gate low voltage VGL as the gate low voltage VGL applied to one side of the first electrostatic preventing units 210a is also applied to the other side of the first electrostatic preventing units 210a. This removes a voltage difference between both sides of the first electrostatic preventing units 210a. To apply the gate low voltage VGL to the other side of the first electrostatic preventing units 210a, the first gate line 218 is formed along the outer periphery of the first substrate. The first electrostatic preventing units 210a are commonly connected to the first gate line 218, and the first gate line 218 is electrically connected to the common voltage line 232 through the third electrostatic preventing units 210c.

The first electrostatic preventing units 210a are connected to the data driving unit 205 with the shortest distance in order to apply a gate low voltage VGL having a minimized voltage lowering to the first electrostatic preventing units 210a.

In the above LCD device, the same potential is formed at both sides of the electrostatic preventing units thereby minimizing generation of a leakage current. Thus, a gate low voltage or a gate high voltage applied to the gate lines can be constantly maintained to thereby prevent degradation of the picture quality due to the leakage current of the electrostatic preventing units.

Also, the line provided to form the same potential at both sides of the electrostatic preventing units is connected to the electrostatic preventing units, so that an inferior driving of the LCD device due to an electrostatic discharge can be prevented.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A display device comprising:
   first and second substrates attached to each other with a cell gap there between; an image display unit containing a plurality of pixels arranged on the first substrate;
   a common electrode on the second substrate;
   a plurality of gate lines arranged on the first substrate in a horizontal direction and applying a gate low voltage and a gate high voltage to the image display unit;
   a plurality of data lines arranged on the first substrate in a vertical direction and applying image information to the image display unit;
   a common voltage line formed on the first substrate and applying a common voltage to the common electrode in the second substrate through the connecting member between the first and second substrates;
   a dummy gate line formed along an outer periphery region of the image display unit, the dummy gate line configured to substantially maintain only gate low voltage;
   first electrostatic preventing units respectively connected to one side of the gate lines and commonly connected to the dummy gate line at another side of the first electrostatic preventing units;
   second electrostatic preventing units respectively connected to one side of the data lines and commonly connected to the common voltage line; and
   third electrostatic preventing units connecting the first gate line and the common voltage line.

2. The display device of claim 1, wherein the first, second, and third electrostatic preventing units are formed at an outer periphery region of the image display unit.

3. The display device of claim 1, wherein only a gate low voltage is applied to the first gate line.

4. The display device of claim 3, wherein the dummy gate line is connected to the gate low voltage at only one location.

5. The display device of claim 3, wherein the dummy gate line is connected to the gate low voltage at a plurality of locations.

6. The display device of claim 5, wherein the dummy gate line is connected to the gate low voltage at opposing sides of the dummy gate line in the horizontal direction.

7. The display device of claim 1, wherein the dummy gate line is connected to the common voltage line through multiple parallel third electrostatic preventing units at one location.

8. A display device comprising:
   first and second substrates attached to each other with a cell gap there between;
   a plurality of gate lines and data lines arranged on the first substrate in horizontal and vertical directions and defining a plurality of pixels;
   a gate driving unit applying a gate low voltage and a gate high voltage to the pixels through the gate lines, the gate driving unit being connected to one end of the gate lines;
   a data driving unit applying image information to the pixels through the data lines;
   a first line connected to other end of the gate lines through first electrostatic preventing units, the first line connected to the data driving unit and to which the gate low voltage is applied from the data driving unit;
   a gate low voltage line electrically connection the data driving unit, the gate driving unit, and the first line such that the data driving unit supplies gate low voltage to the gate driving unit and the first line; and
   a common voltage line connected to the data lines through second electrostatic preventing units, and connected to the first lines through a third electrostatic preventing unit,
   wherein the first line is disposed between the first electrostatic preventing units and the common voltage line.

9. The display device of claim 8, wherein the first line is formed outside a viewable region of the display device.

10. The display device of claim 8, wherein the first, second, and third electrostatic preventing units are formed outside a viewable region of the display device.

11. The display device of claim 8, wherein the gate lines are connected to the data lines through the first, second, and third electrostatic preventing units.

12. The display device of claim 8, wherein only a gate low voltage is applied to the first gate line.

13. The display device of claim 12, wherein the first gate line is connected to the gate low voltage at only one location.

14. The display device of claim 12, wherein the first gate line is connected to the gate low voltage at a plurality of locations.

15. The display device of claim 14, wherein the first gate line is connected to the gate low voltage at opposing sides of the first gate line.

16. The display device of claim 8, wherein the first gate line is connected to the common voltage line through a plurality of third electrostatic preventing units.

17. The display device of claim 16, wherein the third electrostatic preventing units are connected to the same location on the first line.

18. The display device of claim 8, wherein the first line is a dummy line to which neither the gate low voltage nor the gate high voltage is applied from the gate driving unit.

19. The display device of claim 1, wherein the common voltage line is formed on the first substrate vertically and horizontally on the outer periphery region of the image display unit.

20. The display device of claim 8, wherein the first line is formed along an outer periphery region of an image display unit containing the plurality of pixels, the first line being configured to substantially maintain only gate low voltage.

21. The display device of claim 20, wherein the first line is formed along vertically and horizontally on the outer periphery region of the image display unit.

22. The display device of claim 8, wherein the common voltage line has one end connected to the data driving unit and another end connected to the gate driving unit.

23. The display device of claim 22, wherein the common voltage line is formed along at least two outer peripheral sides of the first substrate along the horizontal and vertical directions.

* * * * *